(12) United States Patent
Ueoka

(10) Patent No.: US 7,187,841 B2
(45) Date of Patent: Mar. 6, 2007

(54) REPRODUCING SYSTEM

(75) Inventor: Shouji Ueoka, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 1113 days.

(21) Appl. No.: 10/144,933

(22) Filed: May 15, 2002

(65) Prior Publication Data

US 2002/0172494 A1    Nov. 21, 2002

(30) Foreign Application Priority Data

May 15, 2001    (JP) .............................. 2001-144112

(51) Int. Cl.
*H04N 5/76*    (2006.01)
*H04N 7/00*    (2006.01)
*H04N 5/00*    (2006.01)

(52) U.S. Cl. ........................................ 386/46; 386/125

(58) Field of Classification Search .................... 386/1, 386/45, 46, 125, 126; 725/89, 55; 348/559, 348/706

See application file for complete search history.

(56) References Cited

U.S. PATENT DOCUMENTS 6,311,011 B1 * 10/2001 Kuroda ........................ 386/46

7,020,892 B2 * 3/2006 Levesque et al. ............. 725/89
7,050,705 B1 * 5/2006 Mori ........................... 386/125

FOREIGN PATENT DOCUMENTS

| JP | 07-212713 | 8/1995 |
| JP | 07-307936 | 11/1995 |
| JP | 10-243352 | 9/1998 |

* cited by examiner

*Primary Examiner*—Thai Q. Tran
*Assistant Examiner*—Nigar Chowdhury
(74) *Attorney, Agent, or Firm*—Wenderoth, Lind, & Ponack, L.L.P.

(57) ABSTRACT

A reproducing system having a simultaneous recording and reproducing means that is functionally more sophisticated. This sophisticated recording and reproducing means can perform recording and reproducing of received data more properly even when the power is turned off, or the received channel is changed. The reproducing system includes a simultaneous recording and reproducing means which, as recording received data in a recording means, can either arbitrarily choose and reproduce data recorded in the recording means or arbitrarily choose and reproduce in-reception data according to operations, and a recording continuing means operable to maintain the reception and continue recording data into the recording means for a prescribed period from a reception stop.

9 Claims, 5 Drawing Sheets

REPRODUCING SYSTEM

BACKGROUND OF THE INVENTION

1. Field of the Invention

The present invention relates to a reproducing system having a simultaneous recording and reproducing means which, as temporarily recording received data to be reproduced in a recording means, can either arbitrarily choose and reproduce data to be reproduced recorded in the recording means or arbitrarily choose and reproduce in-reception data to be reproduced according to operations.

2. Description of the Related Art

Conventional recording/reproducing systems of sound or video were generally systems of recording on magnetic tapes with analog signals or digital signals. However, because of improvements in the technology of digital data, improvements in data recording density, or increased capacities of semiconductor recording elements, recording/reproducing systems of types that digital data is recorded on a magnetic disk, an optical disk, or a RAM have become widely available. The recording/reproducing systems of these types have the advantage of being capable of reproducing recorded music or video rapidly from any given point.

Because the recording and readout speed of data is sufficiently higher than the reproducing speed of audio and visual data (hereinafter, both of them together are referred to as AV data) at present, so-called simultaneous recording and reproducing is getting practicable. Whereby, as input AV data is recorded, any given AV data already recorded can be reproduced substantially at the same time as the recording.

Applying the technology of the recording/reproducing system which enables the above-described simultaneous recording and reproducing, for example, it becomes possible to use the system in such a way that a TV broadcast program on the air has been temporarily recorded during usual broadcast watching (even if a recording operation is not performed) and the program contents broadcasted only a short while ago are reproduced according to the user's operation. When the user wants to reproduce a certain scene once more, for example, when the user was late in starting watching for some reason of the user's, or when the user missed the scene the user had wanted to watch in the case of a relay sportscast or the like, it is getting possible to reproduce parts of the last broadcast contents the user wants to watch at a normal rate and return to the real-time broadcast contents, or to reproduce the last broadcast contents by high-speed reproduction, gradually get closer in time to the real-time broadcast contents and at last catch up with the real-time broadcast.

However, when an operation such as turning off the power or changing the received broadcast wave is performed, the data temporarily recorded is cleared in order to record the next broadcast contents. Therefore, even if the user returns the reception to its original state at once, the user cannot watch the last broadcast contents, leading to the user's dissatisfaction.

BRIEF SUMMARY OF THE INVENTION

The present invention was accomplished in order to solve the above problem, and it is an object of the present invention to provide a reproducing system, having a simultaneous recording and reproducing means which is functionally more sophisticated.

In order to achieve the above object, a reproducing system (1) according to the present invention is characterized by being a reproducing system which can reproduce received data and data recorded in a recording means, having a simultaneous recording and reproducing means which, as recording received data in a recording means, can either arbitrarily choose and reproduce data recorded in the recording means or arbitrarily choose and reproduce in-reception data according to operations, and a recording continuing means to maintain the reception and continue recording data to be reproduced into the recording means for a prescribed period from a reception stop.

Using the above reproducing system (1), even if an operation such as turning off the power is performed, the recording of data to be reproduced is continued for a prescribed period. Therefore, it is possible to watch (listen to) the contents broadcasted during the reception pausing operation only by returning the reception to its original state within the period.

A reproducing system (2) according to the present invention is characterized by the prescribed period, being a prescribed time in the above reproducing system (1).

Using the above reproducing system (2), as long as the reception pausing operation is kept within the prescribed time, it is possible to watch or listen to (hereinafter, both of them together are referred to as watch) the contents broadcasted during the pausing state.

A reproducing system (3) according to the present invention is characterized by having a time setting means which enables the user's selection of the prescribed time in the above reproducing system (2).

Using the above reproducing system (3), the upper limit of the pausing time to which the user can watch the original broadcast contents broadcasted during the reception pausing operation can be set to suit his/her preference, so that it is possible to strike a balance with, for example, the temporary recording start time of the next received broadcast.

A reproducing system (4) according to the present invention is characterized by the prescribed period, being a period during which the volume of data to be reproduced recorded in the recording means after a reception stop reaches a prescribed capacity in the above reproducing system (1).

Using the above reproducing system (4), as long as the reception pausing operation is kept within the time corresponding to the data recording capacity into the recording means, it is possible to watch the contents broadcasted during the pausing state, leading to effective use of the recording means.

A reproducing system (5) according to the present invention is characterized by having a capacity setting means which enables the user's selection of the prescribed capacity in the above reproducing system (4).

Using the reproducing system (5), the upper limit of the pausing time to which the user can watch the original broadcast contents broadcasted during the reception pausing operation can be set to suit his/her preference, so that it is possible to strike a balance with, for example, the temporary recording start time of the next received broadcast, and to strike a balance with the capacity of the recording means used by the other functions.

A reproducing system (6) according to the present invention is characterized by having a recording capacity detecting means to detect the recording capacity of the recording means and an automatic period setting means to set the prescribed period based on the recording capacity detected by the recording capacity detecting means in any of the above reproducing systems (1)–(5).

Using the above reproducing system (6), the recording capacity of the recording means can be effectively used, leading to effective use of the recording means.

A reproducing system (7) according to the present invention is characterized by being a reproducing system which can reproduce received data and data recorded in a recording means, having a simultaneous recording and reproducing means which, as recording received data in a recording means, can either arbitrarily choose and reproduce data recorded in the recording means or arbitrarily choose and reproduce in-reception data according to operations, and a reproduced data connecting means to connect data to be reproduced before and after a period of receiving a changed broadcast wave in the case of the received broadcast wave being temporarily changed.

Using the above reproducing system (7), even if the reception is temporarily paused by power-down or changing of the received broadcast in the case of a reproducing system having only one receiving circuit or the like, the broadcast contents before and after the pause are connected, and the same broadcast can be reproduced in a continuous state (though the contents are incontinuous), so that the user can watch the broadcast contents in a state as natural as possible.

A reproducing system (8) according to the present invention is characterized by having a time measuring means to measure a time of a temporary change when the received broadcast wave is temporarily changed, and a connection limiting means to allow the reproduced data connecting means to connect data to be reproduced before and after a period of receiving a changed broadcast wave only when the time measured by the time measuring means is not longer than a prescribed time in the above reproducing system (7).

Using the above reproducing system (8), the broadcast contents before and after the pause are connected substantially without gap when the pausing time is short. Therefore, it is possible to prevent the occurrence of a situation wherein a sudden change in the broadcast contents is caused by connecting the broadcast contents in the case of a long pausing time, leading to unnatural reproduction. Here, when the pausing time is long, it is possible to stop connecting, or to connect them with a space (an imageless picture, silence, or a prescribed image or sound) being inserted.

A reproducing system (9) according to the present invention is characterized by having a connected portion reproducing means to reproduce a connected portion with a nonreproducing state being added thereto when the data to be reproduced, connected by the reproduced data connecting means, are reproduced in the above reproducing system (7) or (8).

Using the above reproducing system (9), since the user can find that the reception was paused at that point of time, and know the reason for a little unnatural state of reproduction, it is possible to restrain the user's dissatisfaction.

A reproducing system (10) according to the present invention is characterized by having a nonreproducing time setting means which enables the user's selection of the duration of the nonreproducing state in the above reproducing system (9).

Using the above reproducing system (10), the user can select the duration of the nonreproducing state to suit his/her preference.

A reproducing system (11) according to the present invention is characterized by being an image reproducing system, wherein the connected portion reproducing means reproduces a freeze-frame picture of the immediately preceding reproduced image as a nonreproducing state in the above reproducing system (9) or (10).

Using the above reproducing system (11), the user can find the occurrence of a reception pause at a point of time when a freeze-frame picture is reproduced, and know the reason for a little unnatural state of reproduction, leading to restraining the user's dissatisfaction. And since a freeze-frame picture of the broadcast program the user is watching is displayed, the user can, although slightly, know the broadcast contents. As a result, the user can start watching more naturally even when the reproduction is resumed.

A reproducing system (12) according to the present invention is characterized by the duration of the nonreproducing state, being a time period during which a changed broadcast wave is temporarily received in the above reproducing system (9).

Using the above reproducing system (12), since the reproduction is synchronized with the real-time broadcast in time, more natural reproduction in time is performed.

A reproducing system (13) according to the present invention is characterized by the duration of the nonreproducing state, being zero in the above reproducing system (9).

Using the above reproducing system (13), the contents are non-continuous but the reproduction is continuous, leading to no waste of the watching time, which makes it possible to watch in a short time.

A reproducing system (14) according to the present invention is characterized by having a connected portion indicating means to indicate the existence of a connected portion when the connected portion is reproduced, in the case of reproducing the data to be reproduced connected by the reproduced data connecting means in any of the above reproducing systems (7)–(13).

Using the above reproducing system (14), the user can clearly know that a connection was made at the portion, leading to causing no user's dissatisfaction.

DETAILED DESCRIPTION OF THE DRAWINGS

Figure 4:
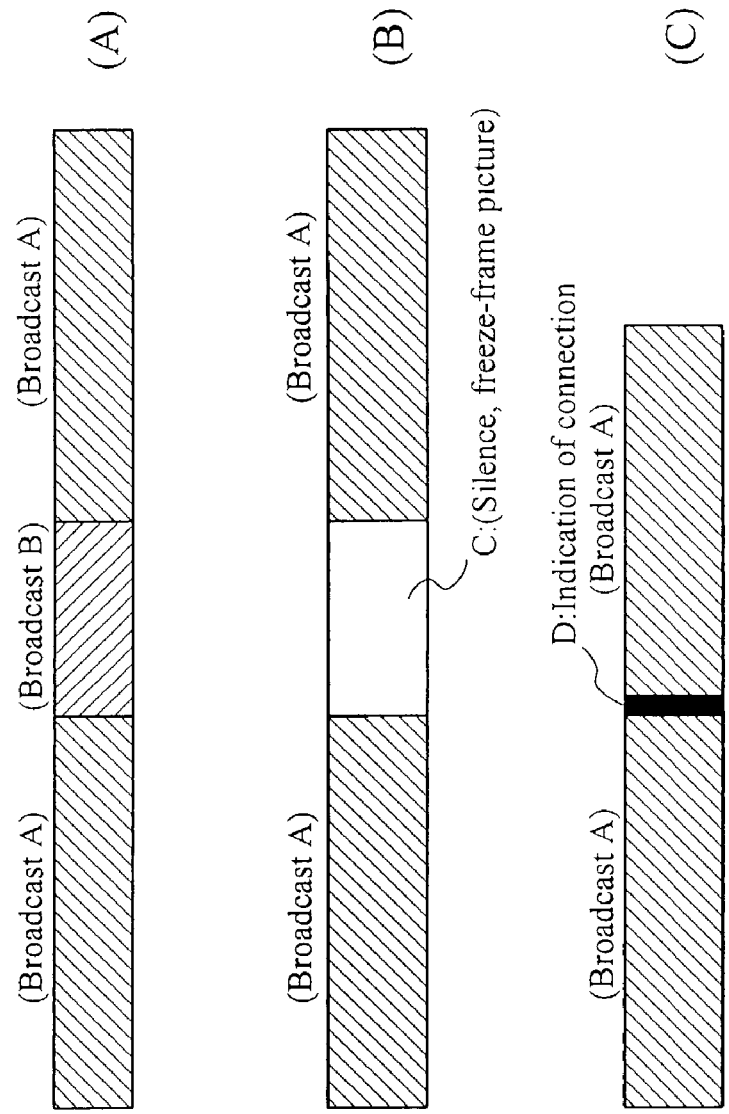
Figure 5:
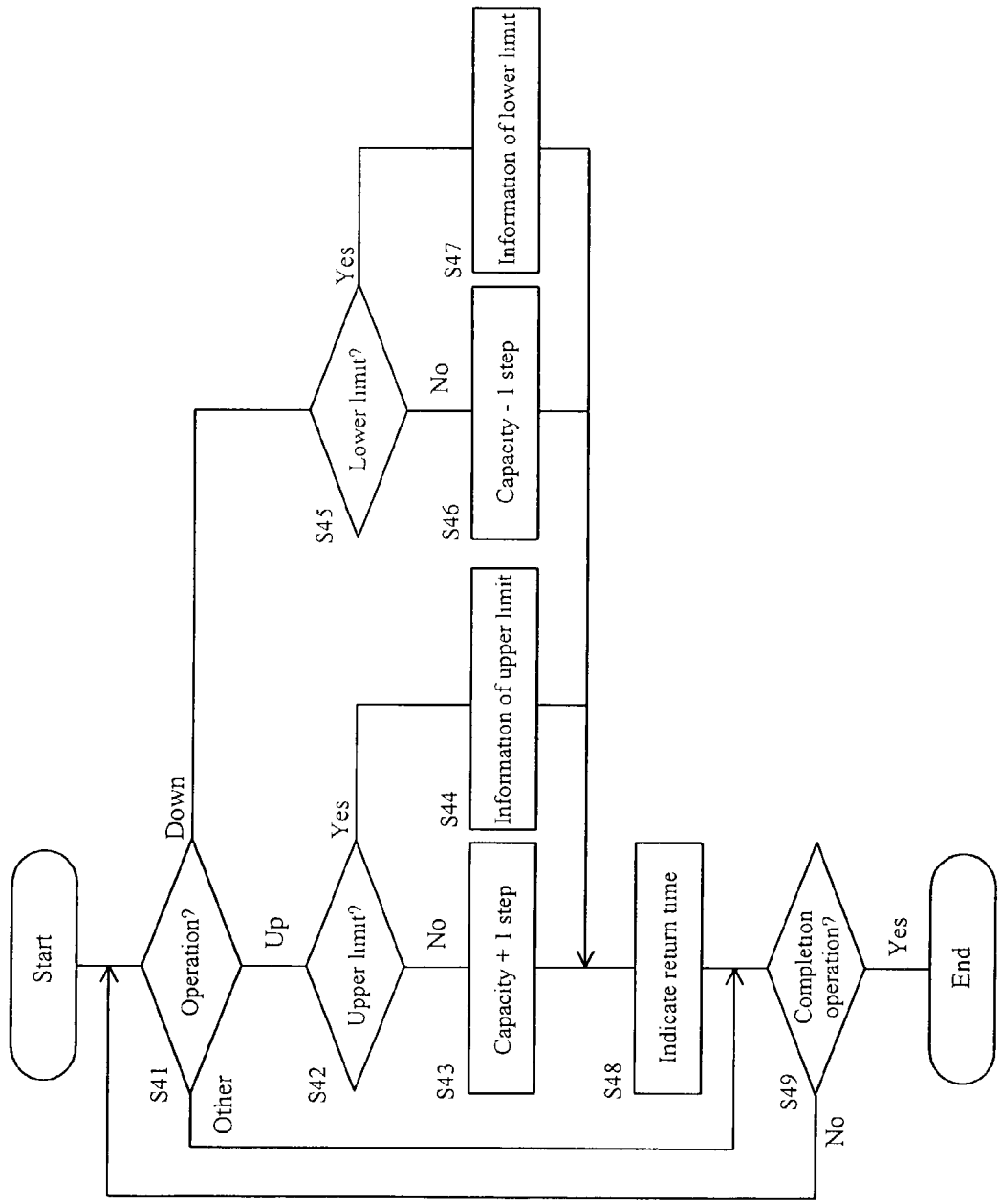

FIG. 4 comprises state explanatory diagrams showing the recording state of cached data; and FIG. 5 is a flow chart showing the return time setting performed by the controller.

DETAILED DESCRIPTION OF THE INVENTION

Figure 1:
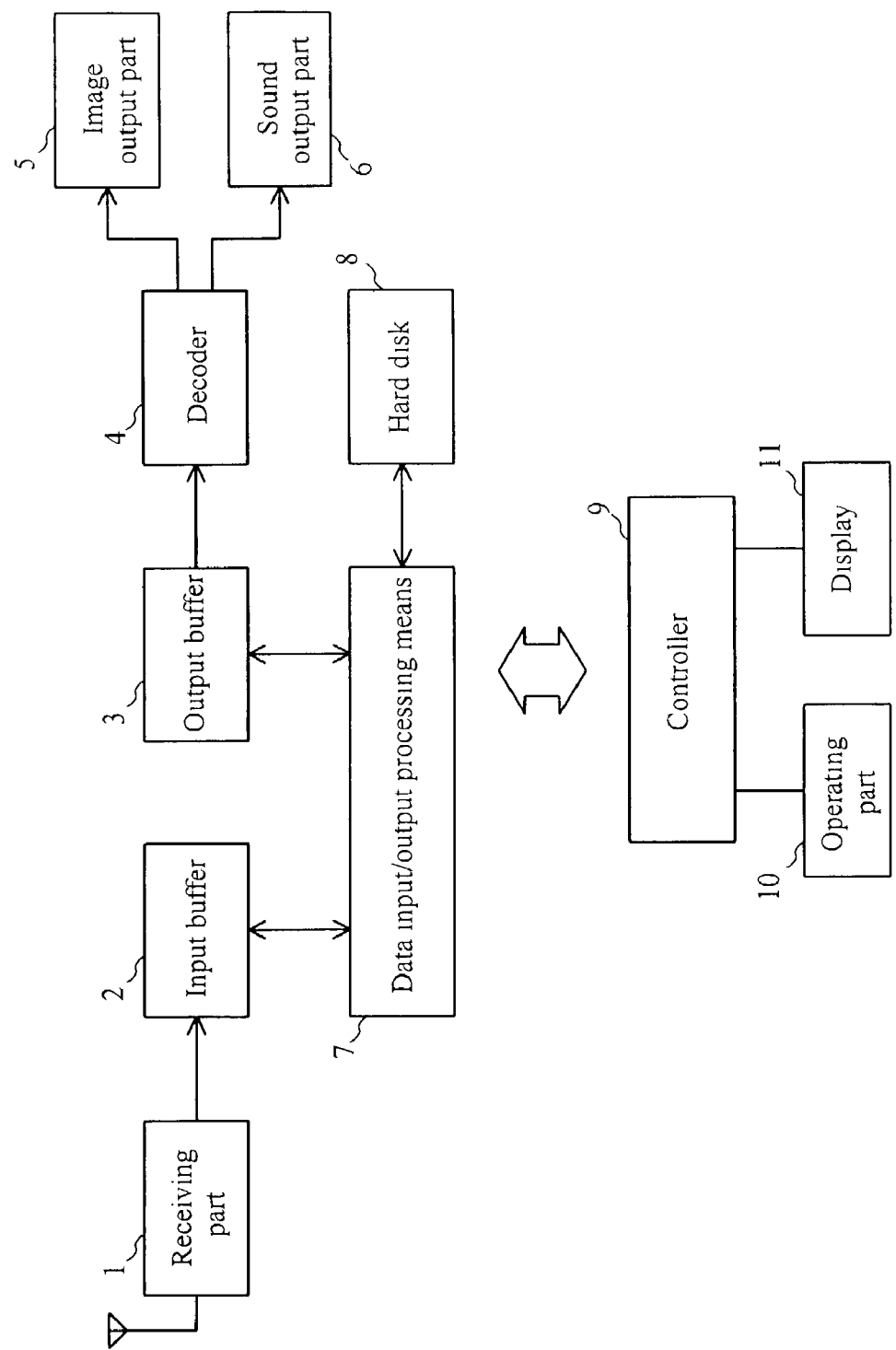
FIG. 1 is a system block diagram schematically showing a construction of a reproducing system according to an embodiment of the present invention.

A reproducing system according to a preferred embodiment of the present invention is described below by reference to those FIGS. 1–5. FIG. 1 is a system block diagram schematically showing a construction of a reproducing system according to an embodiment of the present invention.

Referring to FIG. 1, receiving part 1 receives a digital television broadcast wave and outputs digital signals generated by demodulating the received television broadcast wave. The digital signals output from the receiving part 1 are sequentially recorded in an input buffer 2 comprising a RAM. A data input/output processing means 7, comprising a semiconductor logic circuit which controls reading and writing of data in the input buffer 2, an output buffer 3, and a hard disk 8.

The hard disk 8 is a recording device operable to magnetically record data on a magnetic disk, being of high capacity and writable at higher speeds than the speed of reception and reproduction of AV data, which can speedily read in data written in any given location. A recording device satisfying these conditions such as an optical (or magnetic-optical) disk recording device or a high-capacity semiconductor memory (RAM) makes the hard disk 8 implementable. A signal showing the recording capacity of the hard disk 8 is output from the hard disk 8 to a controller 9.

AV data to be reproduced are sequentially written into the output buffer 3 by the data input/output processing means 7. A decoder 4 sequentially decodes the AV data written in the output buffer 3, and outputs the image data to an image output part 5 and outputs the sound data to a sound output part 6. The image output part 5, comprising a liquid crystal display and the like, displays images corresponding to the image data from the decoder 4. And the sound output part 6, comprising a sound amplifying circuit, a speaker and the like, outputs sounds corresponding to the sound data from the decoder 4.

The controller 9, comprising a microcomputer, controls the overall action of the reproducing system. An operating part 10 which is connected to the controller 9, comprising a switch, a volume and the like, inputs various operations conducted by the user such as a reproduction command to the controller 9. A display 11 which is connected to the controller 9, comprising a liquid crystal display, a vacuum fluorescent display tube and the like, indicates the operating conditions of the reproducing system such as a received channel, a volume control level and the like depending on control signals from the controller 9.

The data input/output processing means 7 writes the data of the input buffer 2 into the hard disk 8 based on the control signals from the controller 9. The data input/output processing means 7 writes the data recorded in the hard disk 8 into the output buffer 3, and controls the clearance of the data recorded in the hard disk 8. The controller 9 controls the reproducing speed by regulating the data writing speed into the output buffer 3, or the decoding speed of the decoder 4. And the controller 9 outputs the image data or sound data so as to perform the control for displaying a predetermined image on the image output part 5 and outputting a predetermined sound from the sound output part 6.

Figure 2:
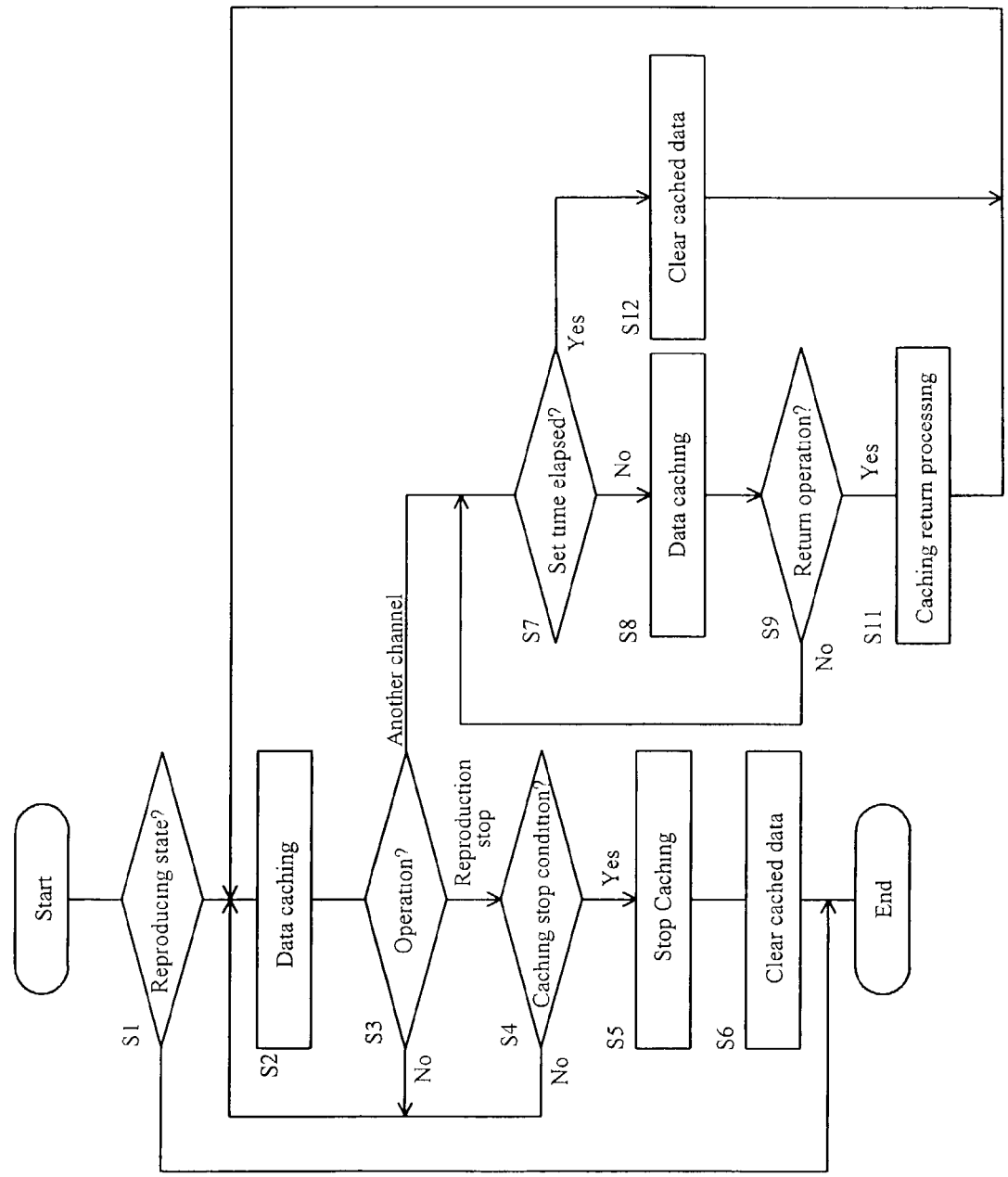
FIG. 2 is a flow chart showing the data recording performed by the controller.

The processing performed by the controller 9 is described below. FIG. 2 is a flow chart showing the processing of data recording performed by the controller 9. Here, this processing is repeatedly conducted with other processing during operation of the reproducing system.

In step S1, whether the reproducing system is in a reproducing state (broadcast wave reception) or not is judged. When it is judged to be in a reproducing state, the processing goes to step S2, when it is judged not to be in a reproducing state, the processing is ended. In step S2, the data input/output processing means 7 is controlled so as to continue data caching which is to sequentially record in-reception AV data in the hard disk 8, followed by step S3. In step S3, the operation of the operating part 10 conducted by the user is judged. When no operation is found, the processing returns to step S2. When the reproduction stop operation is found, the processing goes to step S4. When the switching operation to another channel is found, the processing goes to step S7.

In step S4, whether the stop condition of data caching is satisfied or not is judged. When the condition is judged to be satisfied, the processing goes to step S5, while returning to step S2 when the condition is judged not to be satisfied.

Here, in the case where the return operation to the original reproducing state (reproduction resuming operation) is conducted before the stop condition of data caching is satisfied, the reproduction stop state is cancelled. Therefore, as the processing returns from step S3 to step S2, the data for the stop condition of data caching are reset.

In step S5, the data caching is stopped, followed by step S6. In step S6, the data recorded in the hard disk 8 (cached data) is cleared, leading to the end of the processing. As the stop condition of data caching in step S4, a way of judgment wherein the stop condition is judged to be satisfied when it is judged that a prescribed time has elapsed since the reproduction stop operation, or a way of judgment wherein the stop condition is judged to be satisfied when it is judged that the volume of data caching has reached a prescribed capacity since the reproduction stop operation (when the rate of receiving data is constant, the judgment is the same as in the case of the prescribed time) or the like can be applied. And the judgment criteria of the time and the volume of data caching can be changed depending on the recording capacity of the hard disk 8, or the recording capacity which can be used (is set) for data caching.

Accordingly, the data caching is performed for a prescribed time through the processing in these steps S3–S6, even if the stop operation is carried out.

In step S7, whether a set time has elapsed since the channel switching or not is judged. When it is judged to have elapsed, the processing goes to step S12, while going to step S8 when it is judged not to have elapsed. In step S12, the cached data of received broadcast data before the channel switching is cleared, leading to a return to step S2. In step S8, the data input/output processing means 7 is controlled so as to continue data caching which is to sequentially record in-reception AV data in the hard disk 8, followed by step S9. In step S9, the operation of the operating part 10 carried out by the user is judged. When the return operation to the received channel before the switching is found, the processing goes to step S11, while returning to step S7 when no return operation is found. In step S11, the caching return processing, which is operable to clear the cached data after switching the received channel, and the connection to connect the cached data before switching the received channel to the cached data of the AV data of the received broadcast wave after the return are carried out, leading to a return to step S2.

Here, as the connection, the following processing is performed according to the user's operation of selection. FIG. 4 comprises state explanatory diagrams showing the recording state of cached data, wherein (A) shows the received channel transition state, and (B) and (C) show examples of the recording state of cached data in the received channel transition state of (A).

A: the cached data before the switching and the cached data after the return are connected without gap. In this case, the reproduction is a continuous reproduction substantially without imageless and silent portion (see FIG. 4(C): except the D portion). Here, the contents are non-continuous for the portion of time during the receiving of another channel.

B: an imageless picture (or an information picture showing a break of data) or a freeze-frame picture just before the switching, and a silent portion (or an information sound showing a break of data) for the time during the receiving of another channel are inserted between the data cached before the switching and the data cached after the return for the purpose of connecting the data cached before and after the switching (see FIG. 4(B)).

C: an imageless picture (or an information picture showing a break of data) or a freeze-frame picture just before the switching, and a silent portion (or an information sound showing a break of data) for the connect time selected by the user are inserted between the data cached before the switching and the data cached after the return for the purpose of connecting the data cached. (see FIG. 4(B)).

When the channel switching operation is carried out through the above-described processing in steps S3 and S7–S11 (FIG. 2), the data caching of the received data of the original received broadcast wave is connected to be continued so long as the return to the original channel reception is performed within a prescribed time. In the case where it is judged that the return to the original channel reception is not performed within the prescribed time, the cached data of the original received broadcast wave are cleared and the data caching of the received data of the new received broadcast wave is continued.

Figure 3:
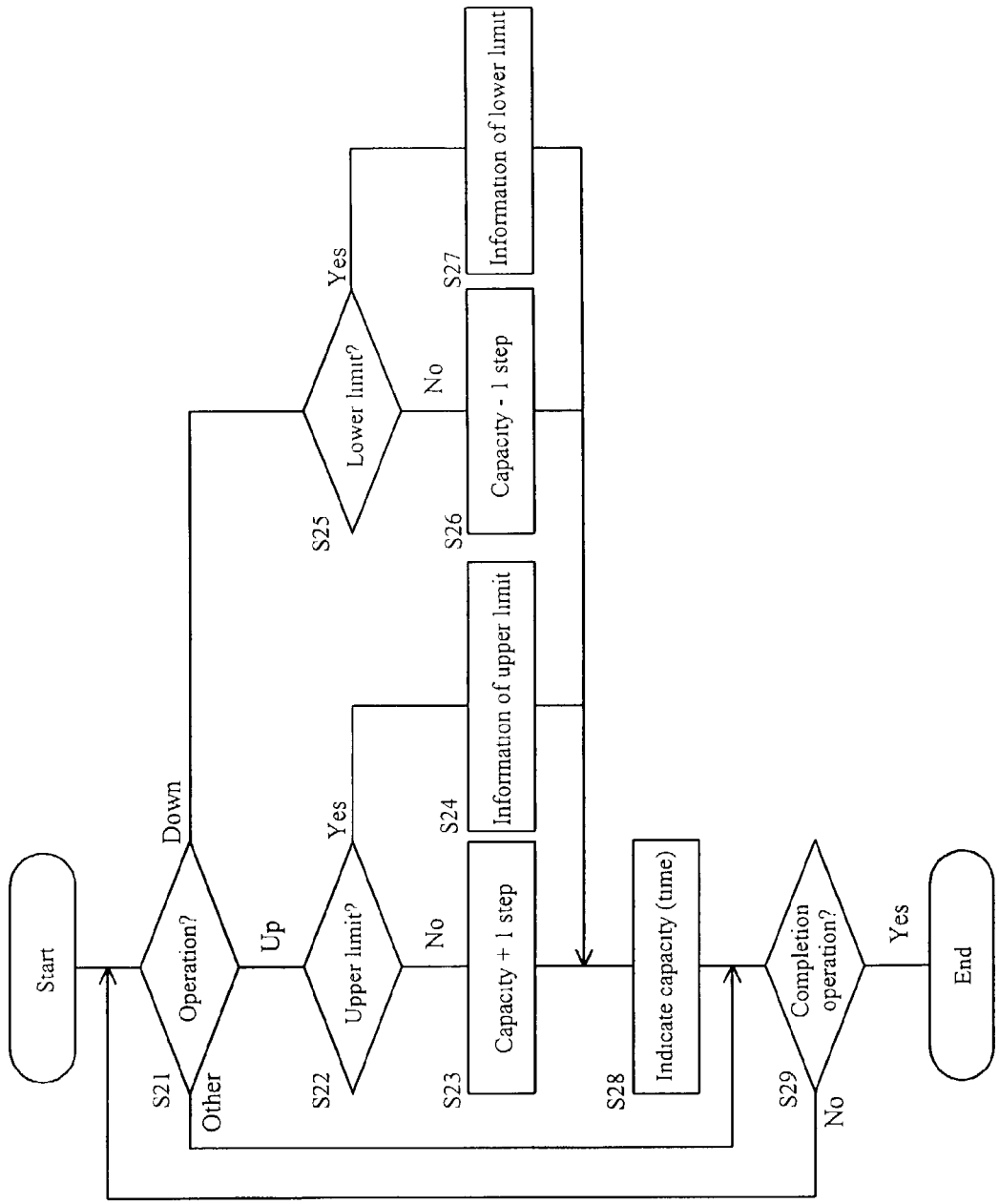
FIG. 3 is a flow chart showing the caching stop condition setting performed by the controller.

The setting of caching stop conditions (capacity and time for judgment in step S4 of FIG. 2) performed by controller 9 is described below. FIG. 3 is a flow chart showing the caching stop condition setting performed by the controller 9. Here, this processing is performed when the caching stop condition setting operation by the user is selected. In the processing, the setting of recording capacity is exemplified for description, but when it is applied to the setting of time, the capacity may be replaced by the time.

In step S21, the user's operation is judged. When it is judged to be a capacity-up operation, the processing goes to step S22. When it is judged to be a capacity-down operation, the processing goes to step S25. And when it is judged to be the others (including no operation), the processing goes to step S29. In step S22, whether the set capacity is the upper limit or not is judged. When it is judged to be the upper limit, the processing goes to step S24, while going to step S23 when it is not judged to be the upper limit. Here, the upper limit of the set capacity is previously determined depending on the recording capacity of the hard disk 8 (or the recording capacity which can be used for caching). In step S23, the set capacity is increased by one step, followed by step S28. In step S24, it is informed (indicated) that the set capacity is already the upper limit, followed by step S28. In step S28, the set capacity (time) is displayed, followed by step S29. In step S29, whether a capacity setting completion operation is carried out by the user or not is judged. When the capacity setting completion operation is judged to have been carried out, the processing is ended, while returning to step S21 when it is not judged to have been carried out.

In step S25, whether the set capacity is the lower limit or not is judged. When it is judged to be the lower limit, the processing goes to step S27, while going to step S26 when it is not judged to be the lower limit. In step S26, the set capacity is decreased by one step, followed by step S28. In step S27, it is informed (indicated) that the set capacity is already the lower limit, followed by step S28.

Through the above-described processing, the user can freely select a caching stop condition between the upper and lower limits.

The return time (time for judgment in step S7 shown in FIG. 2) setting performed by the controller 9 is described below. FIG. 5 is a flow chart showing the return time setting the controller 9 performs. Here, this processing is performed when the setting operation of the return time by the user is selected. In this processing, the setting of time is exemplified for description, but in the case of applying it to the setting of capacity, the time may be replaced by the capacity. Here, the setting of the connect time carried out by the user can be implemented through the same processing. The same processing is performed when the setting operation of the connect time by the user is selected.

In step S41, the operation by the user is judged. When it is judged to be a time-up operation, the processing goes to step S42. When it is judged to be a time-down operation, the processing goes to step S45. And when it is judged to be the others (including no operation), the processing goes to step S49. In step S42, whether the set time is the upper limit or not is judged. When it is judged to be the upper limit, the processing goes to step S44, while going to step S43 when it is not judged to be the upper limit. Here, the upper limit of the set time is previously determined. In step S43, the set time is increased by one step, followed by step S48. In step S44, it is informed (indicated) that the set time is already the upper limit, followed by step S48. In step S48, the set time is displayed, followed by step S49. In step S49, whether a return time setting completion operation is carried out by the user or not is judged. When the completion operation is judged to have been carried out, the processing is ended, while returning to step S41 when it is not judged to have been carried out.

In step S45, whether the set time is the lower limit or not is judged. When it is judged to be the lower limit, the processing goes to step S47, while going to step S46 when it is not judged to be the lower limit. In step S46, the set time is decreased by one step, followed by step S48. In step S47, it is informed (indicated) that the set time is already the lower limit, followed by step S48.

Through the above-described processing, the user can freely select the return time between the upper and lower limits.

What is claimed is:

1. A reproducing system for receiving a selected in-reception data, and for reproducing the selected in-reception data or a data recorded in a recording means, said reproducing system comprising:
    an operating unit operable to provide a stop instruction to stop a reproduction of the selected in-reception data or the data recorded;
    a recording means for recording the selected in-reception data;
    a simultaneous selecting and reproducing means for selecting, according to a selection instruction, either the data recorded in said recording means or the selected in-reception data, and for simultaneously reproducing either the data recorded or the selected in-reception data selected according to the selection instruction;
    a recording continuing means for maintaining a reception of the selected in-reception data and for continuing the recording of the selected in-reception data until a condition for stopping said recording means from recording the selected in-reception data becomes satisfied by the stop instruction to stop the reproduction of the selected in-reception data or the data recorded, a recording capacity detecting means for detecting a recording capacity of said recording means; and
    an automatic period setting means for setting a prescribed period of time, during which said recording means continues to record the selected in-reception data, according to the recording capacity detected by said recording capacity detecting means.

2. A reproducing system for receiving a selected broadcast wave, and for reproducing the selected broadcast wave or a data recorded in a recording means, said reproducing system comprising:

an operating unit operable to provide a change instruction to change the selected broadcast wave;

a recording means for recording the selected broadcast wave;

a simultaneous selecting and reproducing means for selecting, according to a selection instruction, either the data recorded in said recording means or the selected broadcast wave, and for simultaneously reproducing either the data recorded or the selected broadcast wave selected according to the selection instruction; and a data connecting means for connecting a data recorded in said recording means from before a period and after the period of which the selected broadcast wave is temporarily changed according to the change instruction provided by said operating unit.

3. The reproducing system according to claim 2, further comprising a time measuring means for measuring a time period of a temporary change of the selected broadcast wave, wherein said data connecting means performs the connecting of data only when the measured time period of a temporary change of the selected broadcast wave is not longer than a prescribed time.

4. The reproducing system according to claim 2, further comprising a connected portion reproducing means for reproducing a connected portion of data connected by said data connection means, wherein a non-reproducing state is added to the reproducing of the connected portion of data when the data connected by said data connecting means is reproduced by said connected portion reproducing means.

5. The reproducing system according to claim 4, further comprising a non-reproducing time setting means for enabling a user to select a duration of the non-reproducing state.

6. The reproducing system according to claim 4, wherein said connected portion reproducing means is capable of reproducing, as the non-reproducing state, a freeze-frame picture of an immediately preceding image reproduced by said connected portion reproducing means.

7. The reproducing system according to claim 4, wherein the duration of the non-reproducing state is a time period which corresponds to a time period which the selected broadcast wave is temporarily changed.

8. The reproducing system according to claim 4, wherein the duration of the non-reproducing state is zero.

9. The reproducing system according to claim 2, further comprising a connected portion indicating means for indicating the existence of a connected portion of data when the data connected by said data connecting means is reproduced by said connected portion reproducing means.

* * * * *